(12) United States Patent
Sakamoto et al.

(10) Patent No.: US 12,074,288 B2
(45) Date of Patent: Aug. 27, 2024

(54) LITHIUM SECONDARY BATTERY

(71) Applicant: Nippon Telegraph and Telephone Corporation, Tokyo (JP)

(72) Inventors: Shuhei Sakamoto, Musashino (JP); Yoko Ono, Musashino (JP); Hironobu Minowa, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 709 days.

(21) Appl. No.: 17/288,835

(22) PCT Filed: Nov. 7, 2019

(86) PCT No.: PCT/JP2019/043649
§ 371 (c)(1),
(2) Date: Apr. 26, 2021

(87) PCT Pub. No.: WO2020/105448
PCT Pub. Date: May 28, 2020

(65) Prior Publication Data
US 2021/0399342 A1  Dec. 23, 2021

(30) Foreign Application Priority Data

Nov. 21, 2018  (JP) ................. 2018-218080

(51) Int. Cl.
*H01M 10/05* (2010.01)
*H01M 10/0525* (2010.01)
(Continued)

(52) U.S. Cl.
CPC ... *H01M 10/0567* (2013.01); *H01M 10/0525* (2013.01); *H01M 10/0562* (2013.01);
(Continued)

(58) Field of Classification Search
CPC ......... H01M 10/0567; H01M 10/0566; H01M 10/0568; H01M 10/0564; H01M 10/0565;
(Continued)

(56) References Cited

U.S. PATENT DOCUMENTS

2009/0042103 A1* 2/2009 Xiao ................. H01M 10/0567
429/188
2017/0133709 A1* 5/2017 Masuda .............. H01M 10/052
(Continued)

OTHER PUBLICATIONS

Ho Chul Shin et al., *Electrochemical Properties of the Carbon-Coated LiFePO4 as a Cathode Material for Lithium-Ion Secondary Batteries*, Journal of Power Sources, vol. 159, 2006, pp. 1383-1388.
(Continued)

*Primary Examiner* — Raymond Alejandro
(74) *Attorney, Agent, or Firm* — Workman Nydegger

(57) ABSTRACT

A lithium secondary battery is provided with a higher capacity and a longer life. The lithium secondary battery includes: a cathode containing a material that is capable of inserting and desorbing lithium ions; a lithium ion conductive electrolyte; and an anode containing a material that is capable of occluding and releasing lithium metal or lithium ions, wherein the electrolyte contains a metal 6,6'-bis(benzoylamino)-2,2'-bipyridine (babp) complex, which is a metal complex.

8 Claims, 4 Drawing Sheets

METAL 6,6'-BIS (BENZOYLAMINO)
-2,2'-BIPYRIDINE (BABP) COMPLEX

M=Cu, Ni, Co, Zn

(51) Int. Cl.
*H01M 10/0562* (2010.01)
*H01M 10/0565* (2010.01)
*H01M 10/0567* (2010.01)

(52) U.S. Cl.
CPC .......... *H01M 10/0565* (2013.01); *H01M 2300/0037* (2013.01); *H01M 2300/0068* (2013.01); *H01M 2300/0082* (2013.01); *H01M 2300/0085* (2013.01)

(58) Field of Classification Search
CPC ......... H01M 10/0525; H01M 10/0562; H01M 2300/0037; H01M 2300/0068; H01M 2300/0082; H01M 2300/0085
See application file for complete search history.

(56) References Cited

U.S. PATENT DOCUMENTS

2017/0317385 A1* 11/2017 Zhang ............... H01M 10/0525
2018/0366781 A1* 12/2018 Luski ................ H01M 4/525

OTHER PUBLICATIONS

M. X. Li et al., *A Dense Cellulose-Based Membrane as a Renewable Host for Gel Polymer Electrolyte of Lithium Ion Batteries*, Journal of Membrane Science, vol. 476, 2015, pp. 112-118.

Yutao Li et al., *Mastering the Interface for Advanced All-Solid-State Lithium Rechargeable Batteries*, Proc. Natl. Acad. Sci., vol. 113, No. 47, 2016, pp. 13313-13317.

* cited by examiner

METAL 6,6'-BIS (BENZOYLAMINO)-2,2'-BIPYRIDINE (BABP) COMPLEX

TABLE 1

| EXAMPLE | TYPE OF ADDITIVE AGENT | ELECTROLYTE | INITIAL DISCHARGE CAPACITY AT 1 MA/CM² (MAH/G) | RETENTION OF DISCHARGE CAPACITY AT THE 100TH CYCLE RELATIVE TO THE INITIAL DISCHARGE CAPACITY (%) |
|---|---|---|---|---|
| 1 | Cubabp | ELECTROLYTIC SOLUTION | 181 | 96 |
| 2 | Cubabp | GEL POLYMER ELECTROLYTE | 163 | 90 |
| 3 | Cubabp | SOLID ELECTROLYTE | 139 | 87 |
| 4 | Nibabp | ELECTROLYTIC SOLUTION | 184 | 98 |
| 5 | Nibabp | GEL POLYMER ELECTROLYTE | 167 | 91 |
| 6 | Nibabp | SOLID ELECTROLYTE | 143 | 88 |
| 7 | Cobabp | ELECTROLYTIC SOLUTION | 186 | 99 |
| 8 | Cobabp | GEL POLYMER ELECTROLYTE | 168 | 94 |
| 9 | Cobabp | SOLID ELECTROLYTE | 149 | 89 |
| 10 | Znbabp | ELECTROLYTIC SOLUTION | 176 | 95 |
| 11 | Znbabp | GEL POLYMER ELECTROLYTE | 157 | 90 |
| 12 | Znbabp | SOLID ELECTROLYTE | 136 | 86 |
| COMPARATIVE EXAMPLE 1 | ADDITIVE FREE | ELECTROLYTIC SOLUTION | 112 | 62 |

LITHIUM SECONDARY BATTERY

TECHNICAL FIELD

The present invention relates to a lithium secondary battery.

BACKGROUND ART

Conventionally, lithium secondary batteries have been widely used as a power source for mobile electronic equipment such as smartphones, tablets, and laptop computers, which are becoming smaller and thinner, because they have a higher energy density and superior charge/discharge cycle characteristics compared to other secondary batteries such as nickel cadmium secondary batteries and nickel hydrogen secondary batteries.

These electronic devices and others are being used in a wider variety of applications and are being made even thinner and smaller, which also leads to the development of thinner and smaller lithium secondary batteries to be installed in these devices. For example, development of thin and compact lithium secondary batteries that can be installed in IC cards or small medical devices is in progress. It is expected that the demand for thinner and lighter products will remain in the future as well.

In current lithium secondary batteries, attempts have been made to reduce the thickness and weight of the batteries by using electrolytes in a wide variety of forms, including organic electrolytic solutions, aqueous electrolytic solutions, gel polymer electrolytes, and solid electrolytes.

The lithium secondary battery described in Non-Patent Literature 1 exhibits a capacity of about 135 mAh/g under conditions of a current density of 15 mA/g by using 1 mmol/l $LiPF_6$ in EC/DMC/EMC, which is based on organic solvents, as the electrolyte, $LiFePO_4$ as the cathode, and Li as the counter electrode.

The lithium secondary battery described in Non-Patent Literature 2 exhibits a capacity of about 110 mAh/g under conditions of a current density of 50 mA/g by using a gel polymer electrolyte based on a hydroxyethyl cellulose film as the electrolyte, $LiFePO_4$ as the cathode, and Li as the counter electrode.

Also, the lithium secondary battery described in Non-Patent Literature 3 exhibits a capacity of about 120 mAh/g under conditions of 80° C. and a current density of 100 uA/$cm^2$ by using a solid electrolyte that is NASICON type $LiZr_2(PO_4)_3$ as the electrolyte, $LiFePO_4$ as the cathode, and Li as the counter electrode.

CITATION LIST

Non-Patent Literature

Non-Patent Literature 1: H. C. Shin, et al., "Electrochemical properties of the carbon-coated LiFePO4 as a cathode material for lithium-ion secondary batteries", J. Power Sources, 159, 1383-1388, (2006).

Non-Patent Literature 2: M. X. Li, et al., "A dense cellulose-based membrane as a renewable host for gel polymer electrolyte of lithium ion batteries", J. Membr. Sci., 476, 112-118, (2015).

Non-Patent Literature 3: Y. Li, et al., "Mastering the interface for advanced all-solid-state lithium rechargeable batteries", Proc. Natl. Acad. Sci. USA, 113, 13313-13317 (2016).

SUMMARY OF THE INVENTION

Technical Problem

However, there is a problem that all of the lithium secondary batteries disclosed in Non-Patent Literatures 1 to 3 have a lower capacity compared to the theoretical capacity of the cathode active material, 169 mAh/g, due to high resistance at the cathode/electrolyte interface. For practical use, it is necessary to reduce the resistance described above and further improve the performance.

The present invention has been made in view of the problem described above, and it is intended to provide a lithium secondary battery with a higher capacity and a longer life.

Means for Solving the Problem

A lithium secondary battery according to one aspect of the present invention comprises: a cathode containing a material that is capable of inserting and desorbing lithium ions; a lithium ion conductive electrolyte; and an anode containing a material that is capable of occluding and releasing lithium metal or lithium ions, wherein the electrolyte contains a metal 6,6'-bis(benzoylamino)-2,2'-bipyridine (babp) complex, which is a metal complex.

Effects of the Invention

According to the present invention, a lithium secondary battery with a higher capacity and a longer life can be provided.

BRIEF DESCRIPTION OF DRAWINGS

FIG. 5 is a table showing the initial discharge capacity and the retention of discharge capacity for Examples and Comparative Example.

DETAILED DESCRIPTION OF THE INVENTION

Hereinafter, with reference to the drawings, a lithium secondary battery in accordance with an embodiment of the present invention will be described.

Configuration of Lithium Secondary Battery

Figure 1:
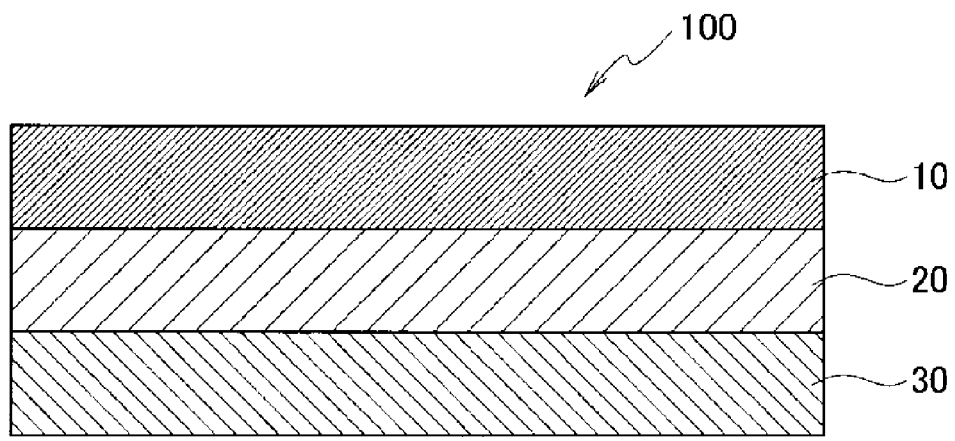
FIG. 1 is a cross sectional view schematically illustrating the basic outline of the configuration of a lithium secondary battery of the present embodiment.

FIG. 1 is a cross sectional view schematically illustrating the basic outline configuration of a lithium secondary battery 100 in accordance with the present embodiment. As illustrated, the lithium secondary battery 100 comprises at least a cathode 10, an electrolyte 20, and an anode 30. The electrolyte 20 is disposed between the cathode 10 and the anode 30.

The lithium secondary battery 100 of the present embodiment is characterized by that the electrolyte 20 contains a metal 6,6'-bis(benzoylamino)-2,2'-bipyridine (babp) complex, which is a metal complex, as an additive agent.

The cathode 10 can contain a catalyst and an electrically conductive material as its components. The electrically conductive material is a material that is capable of inserting and desorbing lithium ions. In addition, it is preferable for the cathode 10 to contain a binding agent to integrate the electrically conductive material.

The anode 30 can contain a material that is capable of releasing and absorbing (occluding) lithium metal or lithium ions (for example, a substance such as a lithium-containing alloy, carbon, and oxide) as its component.

The lithium secondary battery 100 of the present embodiment has a configuration in which the electrolyte 20 is stacked between the cathode 10 and the anode 30.

(I) Electrolyte

The electrolyte 20 of the lithium secondary battery 100 of the present embodiment exhibits lithium ion conductivity and contains at least a metal babp complex as an additive agent.

Figure 2:
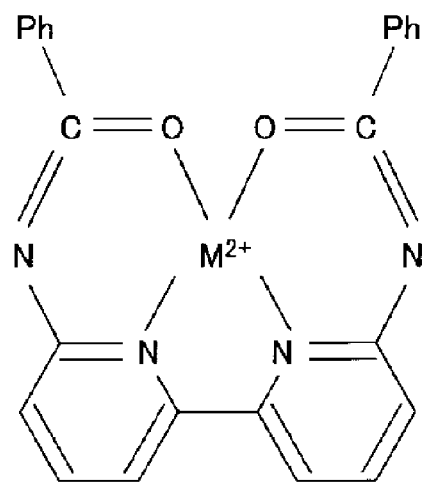
FIG. 2 is a structural formula showing a metal complex that is an electrolyte additive agent of the present embodiment.

The metal babp complex is a metal complex with the structure shown in FIG. 2. In the present embodiment, it is preferable that the metal of the metal babp complex should be selected from any one of the metals Cu, Ni, Co, or Zn.

For the metal babp complex of the present embodiment, the metal babp complexes of Cu, Ni, Co, and Zn may be used singly, or a mixture of two or more of the metal babp complexes of Cu, Ni, Co, and Zn may be used. In the case of mixing two or more metal babp complexes, the mixing ratio is not particularly limited and may be in an arbitrary ratio.

The electrolyte 20 contains a Li salt together with the metal babp complex described above. The Li salt is supplied from a metal salt containing lithium. Specific examples of the metal salt include lithium hexafluorophosphate ($LiPF_6$), lithium perchlorate ($LiClO_4$), lithium trifluoromethanesulfonylamide (LiTFSA) [$(CF_3SO_2)_2NLi$], and lithium bis(pentafluoroethanesulfonyl)imide (LiBETI) for the solute metal salt.

Also, the electrolyte 20 may contain a solvent. The solvent is an organic electrolytic solution with lithium ion conductivity. Examples of the solvent include a carbonic acid ester-based solvent such as dimethyl carbonate (DMC), methyl ethyl carbonate (MEC), methyl propyl carbonate (MPC), methyl isopropyl carbonate (MIPC), methyl butyl carbonate (MBC), diethyl carbonate (DEC), ethyl propyl carbonate (EPC), ethyl isopropyl carbonate (EIPC), ethyl butyl carbonate (EBC), dipropyl carbonate (DPC), diisopropyl carbonate (DIPC), dibutyl carbonate (DBC), ethylene carbonate (EC), propylene carbonate (PC), and 1,2-butylene carbonate (1,2-BC); an ether-based solvent such as 1,2-dimethoxyethane (DME), diethylene glycol dimethyl ether, triethylene glycol dimethyl ether, and tetraethylene glycol dimethyl ether; a lactone-based solvent such as γ-butyrolactone (GBL); water; and a mixed solvent of two or more of the above. In the present embodiment, the mixing ratio in the case of using a mixed solvent is not particularly limited.

The metal babp complex of the present embodiment is added in an amount per volume of the organic electrolytic solution of 1.0 to 50 mmol/l. A larger amount of the metal babp complex added in the electrolyte 20 results in more highly excellent battery characteristic, and it is thus preferable that the metal babp complex should be added in an amount of 50 mmol/l.

Also, the electrolyte 20 may contain a gel polymer (a lithium ion conductive gel polymer electrolyte). As the gel polymer, for example, one of polyvinylidene fluoride (PVdF), polyacrylonitrile (PAN) and polyethylene oxide (PEO)-based gel polymers, or a mixed gel polymer of two or more of the above may be used. In the present embodiment, the mixing ratio in the case of using a mixed gel polymer is not particularly limited.

The metal babp complex of the present embodiment is added in an amount of 1.0 to 30 wt % based on the gel polymer electrolyte. A larger amount of the metal babp complex added in the electrolyte 20 results in more highly excellent battery characteristics, and it is thus preferable that the metal babp complex should be added in an amount of 30 wt %.

Also, the electrolyte 20 may contain a solid electrolyte (a lithium ion conductive solid electrolyte). Examples of the solid electrolyte include an oxide solid electrolyte having the β-eucryptite structure of $LiAlSiO_4$, the ramsdellite structure of $Li_2Ti_3O_7$, the trirutile structure of $LiNb_{0.75}Ta_{0.25}WO_6$, the γ-$Li_3PO_4$ structure of $Li_{14}ZnGe_4O_{16}$ and $Li_{3.6}Ge_{0.6}V_{0.4}O_4$, the antifluorite structure of $Li_{5.5}Fe_{0.5}Zn_{0.5}O_4$, the NASICON type of $Li_{1.3}Ti_{1.7}Al_{0.3}(PO_4)_3$, the β-$Fe_2(SO_4)_3$ structure of $Li_3Sc_{0.9}Zr_{0.1}(PO_4)_3$, the perovskite structure of $La_{2/3-x}Li_{3x}TiO_3$ (x≈0.1), or the garnet structure of $Li_7La_3Zr_2O_{12}$; and a sulfide solid electrolyte having a thio-LISICON material group of $Li_4GeS_4$, $Li_{4-x}Ge_{1-x}P_xS_4$, $Li_{4-3x}Al_xGeS_4$, and $Li_{3+5x}P_{1-x}S_4$.

The metal babp complex of the present embodiment is added in an amount of 1.0 to 30 wt % based on the solid electrolyte. A larger amount of the metal babp complex added to the electrolyte 20 results in more highly excellent battery characteristics, and it is thus preferable that the metal babp complex should be added in an amount of 30 wt %.

(II) Cathode

The cathode 10 of the present embodiment contains at least an electrically conductive material that is capable of inserting and desorbing lithium ions. In addition, the cathode 10 can contain an active material (catalyst) and/or a binding agent, etc., if required.

(II-1) Electrically Conductive Material

It is preferable that the electrically conductive material contained in the cathode 10 should be carbon. Examples of the electrically conductive material of the present embodiment include, but not limited to, carbon blacks such as KETJENBLACK and acetylene black, activated carbons, graphites, carbon fibers, carbon sheets, and carbon cloths. These carbons are available, for example, as commercial products or by synthesis.

(II-2) Active Material

Examples of the active material for the cathode 10 include a stratified rock salt type material such as $LiCoO_2$ and $LiNiO_2$, a spinel type material such as $LiMn_2O_4$, and an olivine type material such as $LiFePO_4$. The active material is not limited to the above as long as it is a known cathode active material.

Specifically, $LiNi(CoAl)O_2$, $LiNi_{1/3}Mn_{1/3}Co_{1/3}O_2$, $LiNi_{0.5}Mn_{0.5}O_2$, $Li_2MnO_3$—$LiMO_2$ (M=Co, Ni, or Mn), $Li_{1+x}Mn_{2-x}O_4$, $Li(MnAl)_2O_4$, $LiMn_{1.5}Ni_{0.5}O_4$, $LiMnPO_4$, $Li_2MSiO_4$, $Li_2MPO_4F$, or the like can be used. These active materials can be synthesized by using a known process such as a solid phase method or a liquid phase method.

(II-3) Binding Agent (Binder)

The cathode 10 can contain a binding agent (binder). This binding agent is not particularly limited, and examples thereof include polytetrafluoroethylene (PTFE), polyvinylidene fluoride (PVDF), and polybutadiene rubber. These binding agents can be used in the form of powder or as a dispersion.

In the lithium secondary battery of the present embodiment, it is desirable that the content of the electrically conductive material in the cathode 10 should be, for example, greater than 0 and less than 100% based on the cathode 10. The contents of other components are the same as in conventional lithium secondary batteries.

(II-4) Preparation of Cathode

The cathode 10 can be prepared as follows. Predetermined amounts of oxide powder as an active material, carbon powder, and binder powder such as polyvinylidene fluoride (PVDF) are mixed, and the resultant mixture is crimped onto a current collector, thereby molding the cathode 10. Alternatively, the aforementioned mixture may be dispersed in a solvent such as an organic solvent to form a slurry, and the slurry is then applied to a current collector and dried, thereby forming the cathode 10. In order to increase the strength of the electrode and to prevent leakage of the electrolytic solution, not only cold pressing but also hot pressing may be used as appropriate. Consequently, a cathode 10 with more highly excellent stability can be prepared.

The cathode 10 may also be prepared by depositing an active material on a current collector using a deposition method such as radio frequency (RF) sputtering.

Examples of the current collector include metal such as metal foil and metal mesh, carbon such as carbon cloth and carbon sheet, and oxide film such as indium tin oxide (ITO), which is obtained by adding tin oxide to indium oxide, and antimony-doped tin oxide (ATO), which is obtained by doping tin oxide with antimony.

(III) Anode

The lithium secondary battery of the present embodiment contains an anode active material in the anode 30. This anode active material is not particularly limited as long as it is a material that can be used as an anode material of lithium secondary batteries. For example, mention may be made of metal lithium. A lithium-containing substance can be given as another example, including an alloy of lithium with silicon or tin, and a lithium nitride such as $Li_{2.6}Co_{0.4}N$, which are materials capable of releasing and occluding lithium ions.

The anode 30 can be formed by a known method. For example, when lithium metal is used for the anode 30, the anode 30 may be prepared by piling up a plurality of metal lithium foils and forming the piled foils into a predetermined shape.

(IV) Other Elements

In addition to the components described above, the lithium secondary battery 100 of the present embodiment can include structural members such as a separator, a battery case, and a metal mesh (for example, a titanium mesh), and other elements required for the lithium secondary battery. For these members and elements, those that are known can be used.

(V) Preparation of Lithium Secondary Battery

Figure 3:
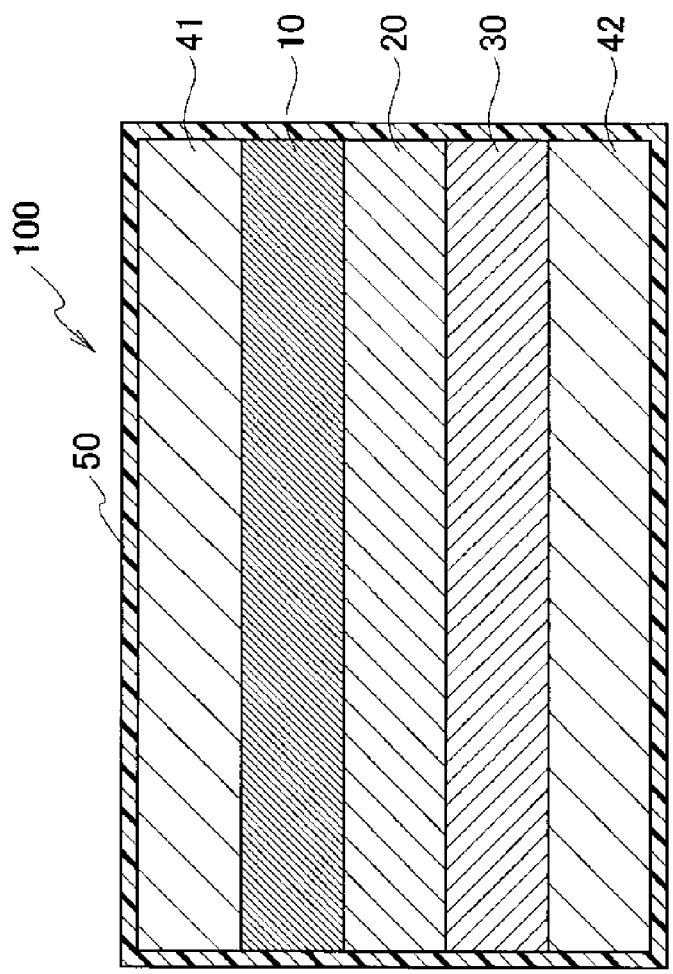
FIG. 3 is a cross sectional view schematically illustrating the configuration of a lithium secondary battery of the present embodiment.

FIG. 3 is a cross sectional view schematically illustrating the configuration of the lithium secondary battery 100 of the present embodiment. With reference to FIG. 3, the method for fabricating the lithium secondary battery 100 will be described.

The lithium secondary battery 100 of the present embodiment comprises at least the cathode 10, the anode 30, and the electrolyte 20, as mentioned above, and, as illustrated in FIG. 3, is configured such that the electrolyte 20 containing the metal babp complex is sandwiched between the cathode 10 and the anode 30. A lithium secondary battery with such a configuration is prepared, for example, as follows.

First, the cathode 10 is fixed to a current collector 41. Also, the anode 30 is fixed to a current collector 42. Next, the cathode 10 fixed to the current collector 41 is disposed and fixed so that it is in contact with the electrolyte 20. In the same way, the anode 30 fixed to the current collector 42 is disposed and fixed so that it is in contact with the electrolyte 20.

As a result, the electrolyte 20 containing the metal babp complex is disposed between the cathode 10 and the anode 30 (inside the lithium secondary battery 100). Then, the configuration sandwiched between the current collector 41 and the current collector 42, as illustrated in FIG. 3, is encapsulated with a housing 50. The cathode 10, the anode 30, and the electrolyte 20 is surrounded with a housing 50, such as a laminate, in an inert atmosphere so as not to come into contact with the atmosphere, whereby the lithium secondary battery is prepared.

In addition to the configuration described above, the lithium secondary battery 100 may have a member such as a separator disposed between the cathode 10 and the anode 30. Also, other insulating members, fixtures, and the like may be disposed as appropriate to prepare the lithium secondary battery 100 for the intended application.

The lithium secondary battery 100 of the present embodiment thus prepared can be expected to significantly extend the drive time of electric vehicles and mobile equipment such as smartphones.

EXAMPLES

For the purpose of confirming the effects of the lithium secondary battery 100 of the present embodiment as mentioned above, several exemplary lithium secondary batteries 100 with different compositions of the electrolyte 20 were prepared and experiments (tests) were conducted to evaluate the characteristics of the batteries. The characteristics of the lithium secondary batteries 100 with various compositions of the electrolyte 20 were evaluated by a battery cycle test.

(Battery Cycle Test)

The battery cycle test was conducted by using a charge/discharge measurement system (manufactured by BioLogic Sciences Instruments). An electric current was supplied at a current density per area of the cathode 10 of 1 $mA/cm^2$, and measurement of the charge voltage was continued until the battery voltage was elevated to 4.0 V from the open circuit voltage. Also, in the battery discharge test, the discharge voltage was measured at the same current density as for the charging until it declined to 2.5 V. The battery charge/discharge tests were carried out under normal living environments. The charge/discharge capacity was expressed in the value per area of the cathode active material ($mA/cm^2$).

Example 1

Preparation of Electrolyte Containing Cu babp

The electrolyte 20 of the lithium secondary battery 100 of Example 1 is an electrolyte containing Cu babp, in which Cu is used as the metal of the metal babp complex (hereinafter, the "Cu babp-containing electrolyte"). In Example 1, the Cu babp-containing electrolyte was prepared by the following procedures.

To commercially available 2,2'-bipyridine-6,6'-diamine (manufactured by TOKYO CHEMICAL INDUSTRY CO., LTD.), benzoyl chloride (manufactured by TOKYO CHEMICAL INDUSTRY CO., LTD.) was added, and babp $H_2$ was obtained by the Schotten-Baumann reaction. The obtained babp $H_2$ and copper(II) acetate monohydrate (manufactured by TOKYO CHEMICAL INDUSTRY CO., LTD.) were subjected to a complexation reaction in methanol, and the resulting system was subjected to recrystallization in benzene to yield Cu babp. The obtained Cu babp was mixed with an electrolytic solution at 50 mmol/l.

During the mixing, dispersion was carried out for 10 minutes by using an ultrasonic cleaning machine at maximum power. The electrolytic solution was obtained by dissolving $LiPF_6$ in an organic solvent EC:DMC (volume ratio of 1:1) at a concentration of 1 mol/l. Using this, the Cu babp-containing electrolyte was obtained.

Then, according to the procedures described in the aforementioned "(V) Preparation of Lithium Secondary Battery", the lithium secondary battery cell (lithium secondary battery) of Example 1, which had the cross sectional structure illustrated in FIG. 3, was prepared. In Example 1, the cathode 10 was obtained by making a slurry of $LiFePO_4$:acetylene black:PVdF=85:10:5 (weight ratio), applying the slurry to an Al foil, and drying it. The lithium secondary battery cell was assembled in dry air with a dew point of −60° C. or lower.

Comparative Example 1

In Comparative Example 1 for comparison with Example 1, a lithium secondary battery was prepared in the same manner as in Example 1, except that 1 mol/l $LiPF_6$/EC:DMC (volume ratio of 1:1) was used as the electrolytic solution for the electrolyte. The conditions for the preparation and cycle test of the lithium secondary battery are the same as in Example 1.

(Charge/Discharge Characteristics)

Figure 4:
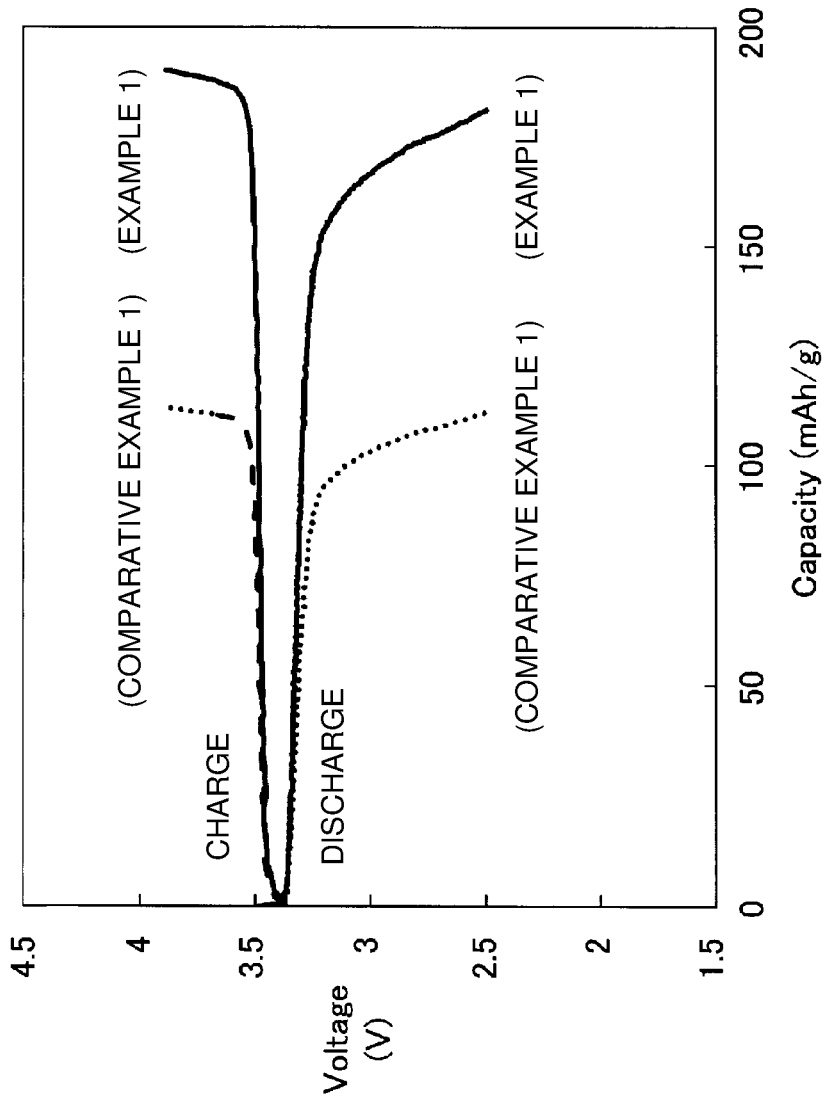
FIG. 4 is a diagram showing the charge/discharge characteristics of lithium secondary batteries of Example 1 and Comparative Example.

FIG. 4 shows the charge/discharge characteristics of the lithium secondary batteries of Example 1 and Comparative Example 1. Specifically, FIG. 4 shows the initial discharge and charge curves when an electric current was supplied at a current density of 1 mA/cm$^2$. The horizontal axis in FIG. 4 is capacity (mAh/g) and the vertical axis is battery voltage (V).

Moreover, FIG. 5 shows the initial discharge capacity and the retention of discharge capacity (performance) at the 100th cycle relative to the initial discharge capacity in Examples and Comparative Example 1.

As shown in FIG. 4 and FIG. 5, the initial discharge capacity at a current density of 1 mA/cm$^2$ was 181 mA/g in Example 1, in which the Cu babp-containing electrolyte was used. In this lithium secondary battery of Example 1, it was found that the initial discharge capacity was equal to or higher than that reported in Non-Patent Literature 1, and that the retention of discharge capacity at the 100th cycle was as high as 96%.

On the other hand, Comparative Example 1 exhibited an initial discharge capacity of 112 mAh/g at a current density of 1 mA/cm$^2$, as shown in FIG. 4 and FIG. 5. Also, in Comparative Example 1, the retention of discharge capacity was as low as 62%.

As described above, it was confirmed that the lithium secondary battery including the Cu babp-containing electrolyte has improved battery characteristics. Hereinafter, other Examples will be described.

Example 2

The electrolyte 20 of the lithium secondary battery 100 of Example 2 was prepared by mixing, into a gel polymer electrolyte, Cu babp obtained in the same procedures as in Example 1 in an amount of 30 wt % (based on the electrolyte). The gel polymer film was prepared by dissolving commercially available hydroxyethyl cellulose (manufactured by Sigma-Aldrich Co. LLC.) in water and subjecting the resultant to heating and vacuum drying treatment. This gel polymer film was impregnated with the same electrolytic solution as in Example 1. In the above-described manner, the Cu babp containing-electrolyte of Example 2 was prepared.

The measurement results of Example 2, as measured according to the same procedures as in Example 1, are shown in FIG. 5. As shown in FIG. 5, it was confirmed that, even when the gel polymer electrolyte was used, the battery characteristics can be improved with an initial discharge capacity of 163 mAh/g and a retention of discharge capacity of 90%.

Example 3

The electrolyte 20 of the lithium secondary battery 100 of Example 3 was prepared by mixing, into a solid electrolyte, Cu babp obtained in the same procedures as in Example 1 in an amount of 30 wt % (based on the electrolyte). The solid electrolyte was prepared by mixing commercially available $Li_2S$ (manufactured by Wako Pure Chemical Industries, Ltd.), $GeS_2$ (manufactured by Wako Pure Chemical Industries, Ltd.), and $P_2S_5$ (manufactured by Sigma-Aldrich Co. LLC.) in a glove box, and subjecting the mixture to heat treatment at 700° C. for 8 hours. This solid electrolyte and Cu babp were mixed and the resulting was molded, thereby preparing the Cu babp-containing electrolyte of Example 3.

The measurement results of Example 3, as measured according to the same procedures as in Example 1, are shown in FIG. 5. As shown in FIG. 5, it was confirmed that, even when the solid electrolyte was used, the battery characteristics can be improved with an initial discharge capacity of 139 mAh/g and a retention of discharge capacity of 87%.

Example 4

Preparation of Electrolyte Containing Ni babp

The electrolyte 20 of the lithium secondary battery 100 of Example 4 is an electrolyte containing Ni babp, in which Ni is used as the metal of the metal babp complex (hereinafter, the "Ni babp-containing electrolyte"). Babp $H_2$ obtained in the same manner as in Example 1 and nickel(II) acetate tetrahydrate (manufactured by Wako Pure Chemical Industries, Ltd.) were subjected to a complexation reaction to yield Ni babp. Then, the obtained Ni babp was mixed into the electrolytic solution at a concentration of 50 mmol/l (per volume of the electrolytic solution), thereby preparing the Ni babp-containing electrolyte of Example 4.

The measurement results of Example 4, which included Ni babp mixed into the electrolyte, as measured according to the same procedures as in Example 1, are shown in FIG. 5. As shown in FIG. 5, it was confirmed that the battery characteristics can be improved with an initial discharge capacity of 184 mAh/g and a retention of discharge capacity of 98%.

Example 5

The electrolyte 20 of the lithium secondary battery 100 of Example 5 was prepared by mixing, into a gel polymer electrolyte, Ni babp obtained in the same procedures as in Example 4 in an amount of 30 wt % (based on the electrolyte).

The measurement results of Example 5, which included Ni babp mixed into the electrolyte, as measured according to the same procedures as in Example 2, are shown in FIG. 5. As shown in FIG. 5, it was confirmed that, even when the gel polymer electrolyte was used, the battery characteristics can be improved with an initial discharge capacity of 167 mAh/g and a retention of discharge capacity of 91%.

Example 6

The electrolyte 20 of the lithium secondary battery 100 of Example 6 was prepared by mixing, into a solid electrolyte, Ni babp obtained in the same procedures as in Example 4 in an amount 30 wt % (based on the electrolyte).

The measurement results of Example 6, which included Ni babp mixed into the electrolyte, as measured according to the same procedures as in Example 3, are shown in FIG. 5. As shown in FIG. 5, it was confirmed that, even when the solid electrolyte was used, the battery characteristics can be improved with an initial discharge capacity of 143 mAh/g and a retention of discharge capacity of 88%.

Example 7

Preparation of Electrolytic Solution Containing Co babp

The electrolyte 20 of the lithium secondary battery 100 of Example 7 is an electrolyte containing Co babp, in which Co is used as the metal of the metal babp complex (hereinafter, the "Co babp-containing electrolyte"). To babp $H_2$ obtained in the same manner as in Example 1 and nickel(II) acetate tetrahydrate (manufactured by Wako Pure Chemical Industries, Ltd.), potassium hydroxide (manufactured by KANTO CHEMICAL CO., INC.) was further added, and the resultant mixture was subjected to a complexation reaction to yield Co babp. Then, the obtained Co babp was mixed into the electrolytic solution at a concentration of 50 mmol/l (per volume of the electrolytic solution), thereby preparing the Co babp-containing electrolyte of Example 7.

The measurement results of Example 7, which included Co babp mixed into the electrolyte, as measured according to the same procedures as in Example 1, are shown in FIG. 5. As shown in FIG. 5, it was confirmed that the battery characteristics can be improved with an initial discharge capacity of 186 mAh/g and a retention of discharge capacity of 99%.

Example 8

The electrolyte 20 of the lithium secondary battery 100 of Example 8 was prepared by mixing, into a gel polymer electrolyte, Co babp obtained in the same procedures as in Example 7 in an amount of 30 wt % (based on the electrolyte).

The measurement results of Example 8, which included Co babp mixed into the electrolyte, as measured according to the same procedures as in Example 2, are shown in FIG. 5. As shown in FIG. 5, it was confirmed that, even when the gel polymer electrolyte was used, the battery characteristics can be improved with an initial discharge capacity of 168 mAh/g and a retention of discharge capacity of 94%.

Example 9

The electrolyte 20 of the lithium secondary battery 100 of Example 9 was prepared by mixing, into a solid electrolyte, Co babp obtained in the same procedures as in Example 7 in an amount of 30 wt % (based on the electrolyte).

The measurement results of Example 9, which included Co babp mixed into the electrolyte, as measured according to the same procedures as in Example 3, are shown in FIG. 5. As shown in FIG. 5, it was confirmed that, even when the solid electrolyte was used, the battery characteristics can be improved with an initial discharge capacity of 149 mAh/g and a retention of discharge capacity of 89%.

Example 10

Preparation of Electrolytic Solution Containing Zn babp

The electrolyte 20 of the lithium secondary battery 100 of Example 10 is an electrolyte containing Zn babp, in which Zn is used as the metal of the metal babp complex (hereinafter, the "Zn babp-containing electrolyte"). Babp $H_2$ obtained in the same manner as in Example 1 and zinc(II) acetate dihydrate (manufactured by Wako Pure Chemical Industries, Ltd.) were subjected to a complexation reaction in tetrahydrofuran to yield Zn(babp $H_2$) $(OAc)_2$. The obtained Zn(babp $H_2$)$(OAc)_2$ was heated to 280° C. in a reduced pressure environment to yield Zn babp. Then, the obtained Zn babp was mixed into the organic electrolytic solution at a concentration of 50 mmol/l (per volume of the electrolytic solution), thereby preparing the Zn-babp containing electrolyte of Example 10.

The measurement results of Example 10, which included Zn babp mixed into the electrolyte, as measured according to the same procedures as in Example 1, are shown in FIG. 5. As shown in FIG. 5, it was confirmed that the battery characteristics can be improved with an initial discharge capacity of 176 mAh/g and a retention of discharge capacity of 95%.

Example 11

The electrolyte 20 of the lithium secondary battery 100 of Example 11 was prepared by mixing, into a gel polymer electrolyte, Zn babp obtained in the same procedures as in Example 10 in an amount of 30 wt % (based on the electrolyte).

The measurement results of Example 11, which included Zn babp mixed into the electrolyte, as measured according to the same procedures as in Example 2, are shown in FIG. 5. As shown in FIG. 5, it was confirmed that, even when the gel polymer electrolyte was used, the battery characteristics can be improved with an initial discharge capacity of 157 mAh/g and a retention of discharge capacity of 90%.

Example 12

The electrolyte 20 of the lithium secondary battery 100 of Example 12 was prepared by mixing, into a solid electrolyte, Zn babp obtained in the same procedures as in Example 10 in an amount of 30 wt % (based on the electrolyte).

The measurement results of Example 12, which included Zn babp mixed into the electrolyte, as measured according to the same procedures as in Example 3, are shown in FIG. 5. As shown in FIG. 5, it was confirmed that the battery characteristics can be improved with an initial discharge capacity of 136 mAh/g and a retention of discharge capacity of 86%.

The electrolyte 20 of the lithium secondary battery 100 of the present embodiment as described above is an electrolyte containing a metal babp complex. The metal of the metal babp complex is selected from Cu, Ni, Co, and Zn. In addition, the electrolyte 20 contains a lithium ion conductive organic electrolytic solution, gel polymer electrolyte, or solid electrolyte.

The lithium secondary battery 100 of the present embodiment including the electrolyte to which the metal babp complex is added as described above is superior to the known materials in capacity and lifetime, as shown in FIG. 5, and it was confirmed that the metal babp complex is effective as an electrolyte additive agent for lithium secondary batteries.

The reason for this may be that the metal babp complex used acts as a charge transport mediator in the electrolytic solution and reduces the interfacial resistance between the cathode (electrode) and the electrolyte, thereby improving the charge/discharge capacity and charge/discharge efficiency.

In other words, the use of a metal complex that is capable of occluding lithium ions can promote the transfer of lithium ions at the cathode/electrolyte interface, which reduces the charge reaction voltage and increases the discharge voltage, thereby achieving the improvement in the battery characteristics.

Accordingly, by adopting the configuration of the lithium secondary battery of the present embodiment, it is possible to provide a lithium secondary battery with a high capacity and a long life.

The present invention is not limited to the embodiments described above, and a number of modifications can be made within the scope of its gist.

INDUSTRIAL APPLICABILITY

By using a metal babp complex as an electrolyte additive agent, a lithium secondary battery with a high capacity and a long lifespan can be prepared, and the lithium secondary battery can be effectively utilized as a drive source for a variety of electronic equipment, automobiles, and the like.

REFERENCE SIGNS LIST

10 Cathode
20 Electrolyte
30 Anode
41, 42 Current collector
50 Housing
100 Lithium secondary battery

The invention claimed is:

1. A lithium secondary battery comprising:
   a cathode containing a material that is capable of inserting and desorbing lithium ions;
   a lithium ion conductive electrolyte; and
   an anode containing a material that is capable of occluding and releasing lithium metal or lithium ions, wherein the electrolyte contains a metal 6,6'-bis(benzoylamino)-2,2'-bipyridine (babp) complex, which is a metal complex.

2. The lithium secondary battery according to claim 1, wherein the metal of the metal complex is selected from Cu, Ni, Co, and Zn.

3. The lithium secondary battery according to claim 1, wherein the electrolyte contains a lithium ion conductive electrolytic solution.

4. The lithium secondary battery according to claim 1, wherein the electrolyte contains a lithium ion conductive gel polymer electrolyte.

5. The lithium secondary battery according to claim 1, wherein the electrolyte contains a lithium ion conductive solid electrolyte.

6. The lithium secondary battery according to claim 2, wherein the electrolyte contains a lithium ion conductive electrolytic solution.

7. The lithium secondary battery according to claim 2, wherein the electrolyte contains a lithium ion conductive gel polymer electrolyte.

8. The lithium secondary battery according to claim 2, wherein the electrolyte contains a lithium ion conductive solid electrolyte.

* * * * *